July 7, 1936.   J. C. ROCH   2,046,847
COMBINED CONDIMENT HOLDER
Filed Aug. 5, 1932
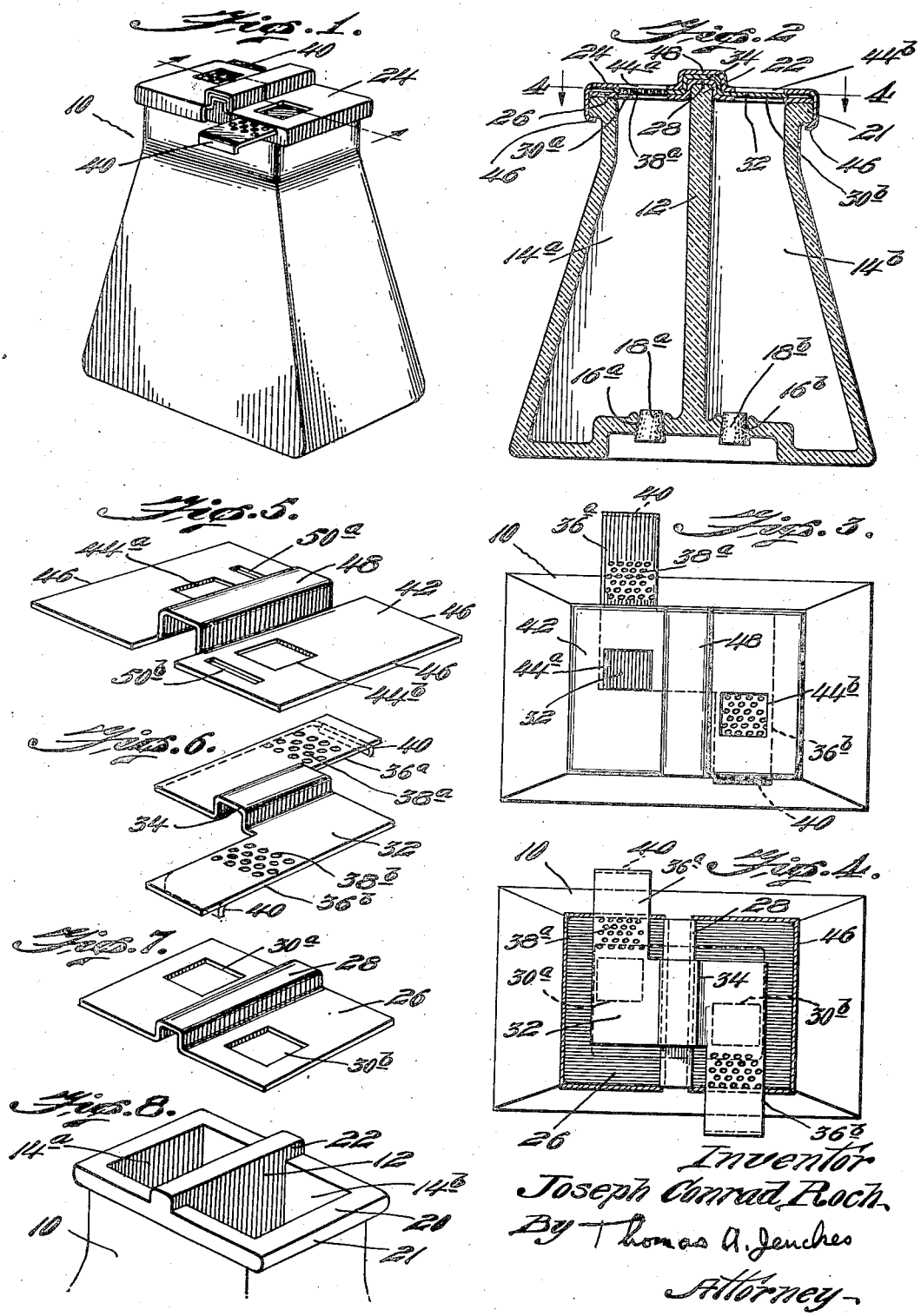
Inventor
Joseph Conrad Roch
By Thomas A. Jenckes
Attorney Patented July 7, 1936

2,046,847

UNITED STATES PATENT OFFICE 2,046,847

COMBINED CONDIMENT HOLDER

Joseph Conrad Roch, West Warwick, R. I., assignor to Frederic W. Roberts, Hope, R. I.

Application August 5, 1932, Serial No. 627,612

6 Claims. (Cl. 65—45)

My invention relates to improvements in condiment holders and by condiments I mean any type of a condiment or seasoning for articles of food in pulverent or powder form.

Hitherto so far as I am aware a separate holder has been made for each respective condiment and this where many condiments are used has necessitated the employment of a considerable number of condiment holders.

An object of my invention is to provide one container divided into compartments for each individual condiment, a dispensing opening from each compartment and a closure member having dispensing portions movable from a position leaving a dispensing portion over one opening for dispensing purposes and closing the other opening to a position closing said first opening and bringing the other dispensing portion over the other opening and if desired to a position closing both openings. It is obvious therefore that I have provided a single unitary means which may be manipulated by the user to free one dispensing opening from one condiment compartment while it is desired by the user to use the condiment in that compartment and close the other compartment to stop the dispensing of the condiment from the other compartment and vice versa alternatively as desired so that by a mere motion of the hand the same container will dispense the desired condiment from its proper compartment. I also preferably so construct my device that the movable closure member may be moved to an intermediate position closing all compartments.

Further features of my invention relate to the provision of such a device so constructed so as to prohibit the entrance of moisture to the condiment. It is well known that salt is deliquescent and will tend to absorb a lot of water, thereby caking up the opening and making it almost impossible to dispense. Employing my construction, however, which when in a closed position is substantially air tight, it is obvious that such a result can not take place.

Further features of my invention relate to the the construction I employ to positively cut off one condiment compartment from the other to prevent any mixing of condiments therein and to provide a construction which will avoid spilling of the condiments from any of the compartments.

These and such other objects of my invention as may hereinafter appear will be best understood from a description of an embodiment thereof such as is shown in the accompanying drawing.

In the drawing, Fig. 1 is a perspective view of a condiment holder constructed in accordance with my invention in a position to dispense condiment from one compartment thereof.

Fig. 2 is a sectional view thereof taken along the line 2—2 of Fig. 1.

Fig. 3 is a plan view thereof with the closure member moved to a position to open the opposite comparment from that shown open in Fig. 1, and closing the compartment shown open in Fig. 1.

Fig. 4 is a sectional view taken along the line 4—4 of Fig. 2 showing the closure member in an intermediate position closing both compartments.

Figs. 5–8 are disassembled perspective views showing the various parts of the cover and dispensing means I preferably employ, Fig. 5 being a perspective view of the upper cover member, Fig. 6 being a perspective view of the movable closure member, Fig. 7 being a perspective view of the lower cover member and Fig. 8 being a perspective view of the top of the condiment container and illustrating the partition which normally divides said container into separate condiment compartments.

In the drawing, wherein like characters of reference indicate like parts throughout, 10 generally indicates a condiment holder constructed in accordance with my invention.

While said condiment holder may be of any shape and be constructed out of any suitable material it preferably comprises a container, glass as shown divided by the partition 12 into the separate condiment compartments 14$^a$ and 14$^b$. While I show the container as being constructed of glass or porcelain, it is obvious that the walls may be constructed out of sheet metal, such as tin or iron, etc. as desired. I provide suitable filling openings 16$^a$ and 16$^b$ for the respective compartments 14$^a$ and 14$^b$ each provided with the removable closure means 18$^a$ and 18$^b$ comprising corks, although it is obvious that metal or other types of stoppers may be used if desired. While I have shown the filling openings 16$^a$ and 16$^b$ in the bottom of the container in a portion raised from the bottom thereof, it is obvious that they may be located in any desired position.

As stated hitherto my invention normally includes a condiment receptacle or container having compartments therein and movable closure means movable from a position opening a dispensing opening in one compartment and closing a dispensing opening in the other compartment to a position opening the dispensing opening in the second compartment and closing the dispensing opening in the first compartment respectively, and if desired to a neutral position closing both compartments. By moving the closure means to an intermediate position it is obvious that the container may be tipped up side down for filling purposes without spilling any condiment.

While said closure means may be constructed in any suitable fashion, in the embodiment shown I preferably construct it in the upper portion of the condiment container as the dispensing opening is normally placed in individual condiment containers on the market today. In the embodiment shown I preferably extend the partition 12 slightly above the top 20 of said container as at 22 and I provide each one of the separate cover and closure members with an upwardly projecting rib or groove adapted to compactly set over said projecting portion 22 and to prevent any moisture going into the different compartments and to prevent one compartment from spilling into the other, although it is obvious that if desired my invention may be constructed without the projecting portion 22 and the respective cooperating grooves. As the cover 24 of said device I preferably employ three separate members, namely, the lower cover member 26 having the raised portion 28 fitting compactly over said partition top 22 and substantially of the same size as the top 20 of said container 10 and having a dispensing opening 30$^a$ and 30$^b$ for each compartment on each side of said raised portion 28. Adapted to overlie said lower cover member 26 I provide the closure member 32 having the cooperatingly raised center portion 34 and having the arms 36$^a$ and 36$^b$ projecting in opposite directions therefrom, each preferably having a perforated portion 38$^a$ and 38$^b$ or dispensing opening or screen portion therein and each outer end 40 thereof turned at right angles thereto to limit the sliding movement thereof. I also provide the upper cover member 42 preferably of larger size than said lower cover member 26 and container top 20 having dispensing openings 44$^a$ and 44$^b$ therein for each respective compartment 14$^a$ and 14$^b$ in line with the respective dispensing openings 30$^a$ and 30$^b$ in said lower cover member 26. As said upper cover member 42 is originally of larger size than said lower cover member, it is obvious that the margins 46 thereof may be crimped down around the bead 21 on the outer top surface of the container to secure the upper cover member 42, the movable closure member 32 and the lower cover member 26 together to form the dispensing cover for said container proper 10. Said upper cover member 42 is also provided with a cooperatingly raised portion 48 and it is obvious that the upper portion of the partition 22 and respective raised portions 28 and 48 form a guideway to guide the raised portion 34 of the movable closure member 32 so that the respective arms 36$^a$ and 36$^b$ thereof may open or close the dispensing openings in said cover as desired. The upper cover member 26 is provided with the slits 50$^a$ and 50$^b$ therein in the margins 46 thereof preferably in line with and opposite said dispensing openings 44$^a$ and 44$^b$ respectively and adapted to receive the projecting ends 40 of the arms 36$^a$ and 36$^b$ of said movable closure member 32, the ends 40 being downturned to prevent the respective arms 36$^a$ and 36$^b$ of the closure member from sliding out of the slits 50$^a$ and 50$^b$. It is thus apparent that the movable closure member 32 is retained between the upper cover member 42 and lower cover member 26 to move the closure arms 36$^a$ and 36$^b$ over said aligned dispensing holes 30$^a$ and 30$^b$ and 44$^a$ and 44$^b$ to completely shut off each hole as shown in Fig. 4, or to bring one dispensing portion 38$^a$ over the aligned dispensing holes 30$^a$ and 44$^a$ in one compartment and a closed portion of the opposite arm 36$^b$ over the aligned holes 30$^b$ and 44$^b$ in the opposite compartment 14$^b$ as shown in Fig. 1 when it is desired to use condiment from the compartment 14$^a$. If it is desired, however, to use the condiment in the compartment 14$^b$ it is obvious that by mere pressure on the end 40 of said movable closure member 32 the entire closure member may be moved over on said guideway 22 so that the dispensing portion 38$^b$ will be brought opposite the aligned holes 30$^b$ and 44$^b$ of the compartment 14$^b$ and so that a solid portion of the arm 36$^a$ will close the aligned holes 30$^a$ and 44$^a$ of the compartment 14$^a$, thereby prohibiting the dispensing of condiment from that respective compartment as shown more particularly in Fig. 3. It is obvious, however, that as shown in Fig. 4 said movable closure member 32 may be moved to a position whereby the solid portions thereof completely cut off the dispensing openings 30$^a$ and 44$^a$ of the compartment 14$^a$ and the dispensing openings 30$^b$ and 44$^b$ in the compartments 14$^b$, thereby prohibiting the loss of condiment from either compartment for shipping purposes, or if desired completely shutting off the dispensing openings so that the container 10 may be tipped upside down and the compartments 14$^a$ and 14$^b$ be refilled.

It is understood that my invention is not limited to the specific embodiment shown and that various deviations may be made therefrom without departing from the spirit and scope of the appended claims.

What I claim is:

1. A condiment holder, comprising a container having a partition extending above the upper top wall thereof and dividing said container into condiment compartments and filling holes for each compartment having closures therein, a lower cover member having a raised portion fitting compactly over said partition and having a dispensing opening therein for each compartment, an upper cover member of larger size than said lower cover member and container top having dispensing openings therein for each compartment aligned with said dispensing openings in said lower cover member having side walls crimped over said lower cover member and the tops of the container side walls to retain said cover members to said container top and having a cooperating guide groove therein and slits in the side walls opposite said dispensing openings and a movable member having a cooperatingly raised center portion contained between said upper and lower cover members having arms projecting over said aligned dispensing openings and out through said slits, each having a perforated portion forming a dispensing screen therein and an imperforate sealing portion therein, whereby said movable member may be moved to positions having an imperforate sealing portion closing either one of said openings and bringing a perforated portion intermediate said other aligned compartment openings and to a position having said imperforate sealing portions closing both compartment openings.

2. A condiment holder, comprising a container having a partition dividing said container into condiment compartments and filling holes for each compartment having closures therein, a lower cover member having a dispensing opening therein for each compartment, an upper cover member of larger size than said lower cover member and container top having dispensing openings therein for each compartment aligned with said dispensing openings in said lower cover member having side walls crimped over said lower cover member and, the top of the container side walls to retain said cover members to said container top and a movable member contained between said upper and lower cover members having arms projecting over said aligned dispensing openings, each having a perforated portion forming a dispensing screen therein and an imperforate sealing portion therein, whereby said movable member may be moved to positions having an imperforate sealing portion closing either one of said openings and bringing a perforated portion intermediate said other aligned compartment openings and to a position having said imperforate sealing portions closing both compartment openings.

3. A condiment holder, comprising a container having a partition extending above the upper top wall thereof and dividing said container into condiment compartments and filling holes for each compartment having closures therein, a lower cover member having a raised portion fitting compactly over said partition and having a dispensing opening therein for each compartment, an upper cover member of larger size than said lower cover member and container top having dispensing openings therein for each compartment aligned with said dispensing openings in said lower cover member having side walls crimped over said lower cover member and the top of the container side walls to retain said cover members to said container top and having a cooperating guide groove therein and slits in the side walls opposite said dispensing openings, and a movable member having a cooperatingly raised center portion contained between said upper and lower cover members having arms projecting over said aligned dispensing openings and out through said slits, each having a perforated portion forming a dispensing screen therein and an imperforate sealing portion therein, whereby said movable member may be moved to positions having an imperforate sealing portion closing either one of said openings and bringing a perforated portion intermediate said other aligned compartment openings.

4. A condiment holder, comprising a container having a partition and dividing said container into condiment compartments and filling holes for each compartment having closures therein, a lower cover member having a dispensing opening therein for each compartment, an upper cover member of larger size than said lower cover member and container top having dispensing openings therein for each compartment aligned with said dispensing openings in said lower cover member having side walls crimped over said lower cover member and the tops of the container side walls to retain said cover members to said container top and a movable member contained between said upper and lower cover members having arms projecting over said aligned dispensing openings each having a perforated portion forming a dispensing screen therein and an imperforate sealing portion therein, whereby said movable member may be moved to positions having an imperforate sealing portion closing either one of said openings and bringing a perforated portion intermediate said other aligned compartment openings.

5. A condiment holder, comprising a container having a partition extending above the upper top wall thereof and dividing said container into condiment compartments, a lower cover member having a raised portion fitting compactly over said partition and having a dispensing opening therein for each compartment, an upper cover member of larger size than said lower cover member and container top having dispensing openings therein for each compartment aligned with said dispensing openings in said lower cover member having side walls crimped over said lower cover member and the tops of the container side walls to retain said cover members to said container top and having a cooperating guide groove therein and slits in the side walls opposite said dispensing openings and a movable member having a cooperatingly raised center portion contained between said upper and lower cover members having arms projecting over said aligned dispensing openings and out through said slits each having a perforated portion forming a dispensing screen therein and an imperforate sealing portion therein, whereby said movable member may be moved to positions having an imperforate sealing portion, closing either one of said openings and bringing a perforated portion intermediate said other aligned compartment openings and to a position having said imperforate sealing portions closing both compartment openings.

6. A condiment holder, comprising a container having a partition dividing said container into condiment compartments, a lower cover member having a dispensing opening therein for each compartment, an upper cover member of larger size than said lower cover member and container top having dispensing openings therein for each compartment aligned with said dispensing openings in said lower cover member having side walls crimped over said lower cover member and the tops of the container side walls to retain said cover members to said container top and a movable member contained between said upper and lower cover members having arms projecting over said aligned dispensing openings, each having a perforated portion forming a dispensing screen therein and an imperforate sealing portion therein, whereby said movable member may be moved to positions having an imperforate sealing portion closing either one of said openings and bringing a perforated portion intermediate said other aligned compartment openings.

JOSEPH CONRAD ROCH.